US006953552B2

(12) United States Patent
Han-Oh et al.

(10) Patent No.: US 6,953,552 B2
(45) Date of Patent: Oct. 11, 2005

(54) SPOTTING DEVICE FOR FABRICATING MICROARRAYS OF BIOLOGICAL SAMPLES AND SPOTTING PIN INSERTED THEREIN

(76) Inventors: Park Han-Oh, 49-3, Moonpyung-Dong, Daedoek-Gu, Daejon 306-220 (KR); Kim Hang-Rae, 49-3, Moonpyung-Dong, Daedeok-Gu, Daejon 306-220 (KR); Ahn Jung-Wook, 49-3 Moonpyung-Dong, Daedeok-Gu, Daejon 306-220 (KR); Song Gu-Young, 49-3, Moonpyung-Dong, Daedoek-Gu, Daejon 306-220 (KR); Oh Gui-Hwan, 49-3, Moonpyung-Dong, Daedoek-Gu, Daejon 306-220 (KR); Cho Yun-Seok, 49-3, Moonpyung-Dong, Daedoek-Gu, Daejon 306-220 (KR); Choi Il-Kyu, 49-3, Moonpyung-Dong, Daedoek-Gu, Daejon 306-220 (KR)

( * ) Notice: Subject to any disclaimer, the term of this patent is extended or adjusted under 35 U.S.C. 154(b) by 516 days.

(21) Appl. No.: 10/127,937

(22) Filed: Apr. 23, 2002

(65) Prior Publication Data

US 2002/0176805 A1 Nov. 28, 2002

(30) Foreign Application Priority Data

Apr. 23, 2001 (KR) .............................. 10-2001-0021828
May 8, 2001 (KR) .............................. 10-2001-0025016

(51) Int. Cl.[7] .............................. B01L 3/02; G01N 1/14
(52) U.S. Cl. .............. 422/100; 73/864.17; 73/864; 73/863.32; 73/864.24; 73/864.31
(58) Field of Search .................... 422/63, 99, 100; 436/180; 73/863.32, 864.17, 864.24, 864.31; 222/330

(56) References Cited

U.S. PATENT DOCUMENTS

| | | | | | |
|---|---|---|---|---|---|
| 6,024,925 | A | * | 2/2000 | Little et al. .................. | 422/100 |
| 6,309,891 | B1 | * | 10/2001 | Shalon et al. ............... | 436/180 |
| 6,575,209 | B2 | * | 6/2003 | Gora ........................... | 141/238 |
| 6,579,499 | B1 | * | 6/2003 | Kennedy et al. ............ | 422/100 |
| 6,610,253 | B2 | * | 8/2003 | Kennedy et al. ............ | 422/100 |
| 6,629,626 | B1 | * | 10/2003 | Horsman et al. ........... | 222/420 |
| 6,752,182 | B2 | * | 6/2004 | Atkinson et al. ........... | 141/130 |
| 6,756,232 | B1 | * | 6/2004 | Schermer et al. ........... | 436/180 |
| 6,759,012 | B2 | * | 7/2004 | Haslam et al. .............. | 422/100 |
| 2001/0044157 | A1 | * | 11/2001 | Shaion et al. ............... | 436/180 |
| 2002/0094304 | A1 | * | 7/2002 | Yang et al. .................. | 422/100 |
| 2002/0173048 | A1 | * | 11/2002 | Nakazawa et al. .......... | 436/180 |
| 2003/0032198 | A1 | * | 2/2003 | Lugmair et al. ............. | 436/180 |
| 2003/0113233 | A1 | * | 6/2003 | Nanthakumar ............. | 422/100 |
| 2004/0026444 | A1 | * | 2/2004 | DeSilva et al. ............. | 221/208 |
| 2004/0033168 | A1 | * | 2/2004 | Hughes et al. .............. | 422/100 |
| 2004/0037750 | A1 | * | 2/2004 | Stimpson et al. ........... | 422/100 |
| 2004/0047765 | A1 | * | 3/2004 | Gordon et al. ................ | 422/63 |
| 2004/0208794 | A1 | * | 10/2004 | Karg et al. .................. | 422/100 |
| 2004/0231438 | A1 | * | 11/2004 | Schwartz ................. | 73/864.17 |

* cited by examiner

*Primary Examiner*—Jill Warden
*Assistant Examiner*—Brian R Gordon
(74) *Attorney, Agent, or Firm*—Stetina Brunda Garred & Brucker

(57) ABSTRACT

The present invention relates to a spotting device for fabricating microarrays of biological materials and a spotting pin inserted therein. More particularly, the present invention is directed to a spotting device, which comprises several pins and pin-guiding holder that allows the pins to move accurately and rectilinearly toward up-down direction by guiding and supporting pins at several points, and spotting pins inserted therein.

7 Claims, 4 Drawing Sheets

SPOTTING DEVICE FOR FABRICATING MICROARRAYS OF BIOLOGICAL SAMPLES AND SPOTTING PIN INSERTED THEREIN

CROSS-REFERENCE TO RELATED APPLICATIONS

This application is related to and claims the benefit of filing dates of the following Korean Patent Applications: (1) 10-2001-0021-828, Filed Apr. 23, 2001 and (2) 10-2001-0025016, Filed May 8, 2001, the teachings of which are expressly incorporated here and by reference.

BACKGROUND OF THE INVENTION

The present invention relates to a spotting device for fabricating microarrays of biological samples and a spotting pin inserted therein. More particularly, the present invention is directed to a spotting device, which comprises several pins and pin-guiding holder that allows the pins to move accurately and rectilinearly toward up-down direction by guiding and supporting pins at several points, and spotting pins inserted therein.

Since the human genome project was completed, a large amount of genetic information has been disclosed incessantly. Several techniques through which functions of genes in various organisms can be interpreted efficiently based on such information have been developed.

For the commercialization of the outcome of the human genome project, functional genomics or system biology is emerging as a subject of research in post-genome era. As a research tool these emerging fields known as a DNA chip, wherein numerous DNA fragments are arrayed on a slide glass or silicon substrate, has been commercialized. The DNA microarraying technology, what is referred to herein as the DNA chip technology, is a quite useful research tool for interpreting expression of a specific gene, mutation, polymorphism and the like, at one time. In addition, the DNA chip technology is a very suitable technique for observing the extent of expression of a known gene, or for screening out or searching for novel genes. See Lipshutz, R. J. et al. (1995) Biotechniques 19, 44 2–447; Chee, M. et al. (1996) Science 274, 610–614, the teachings of which are expressly incorporated herein by reference.

The DNA chip may be prepared through an automatized mechanical device based on molecular biological information, mechanics and electronics. In addition, the DNA chip may be prepared through the integration of numerous kinds of DNA fragments within a small area of a slide glass or silicon substrate. Therefore, the DNA chip makes it possible to screen out or search for many kinds of genes at once within a short time.

Up to now, various types of DNA chip manufacturing technology such as the spotting or contact printing method, the non-contact printing method, and the photolithography have been developed. According to the non-contact printing method, electric force generated by heat, solenoid actuator or piezoelectric actuated device causes a predetermined amount of DNA solution to drop on a plate. However, several reservoirs for the DNA solution are generally required because many kinds of DNA fragments should be integrated in a DNA chip. In addition, because the residual space in the interior of a channel buffers the pressure for dropping the DNA solution, it is difficult to drop the defined volume of the DNA solution accurately.

According to the spotting or contact-printing method, a precise pin having the shape of a sharp needle is dipped in the DNA oligomer solution, a tip of the pin contacts on a slide glass, and then a very small amount of the DNA oligomer solution print on the slide glass. However, in the case of using a needle-shaped pin having no reservoir for the DNA oligomer solution, the pin should be dipped in the solution whenever spotting. Therefore, this pin can be used only in the device that employs a kind of special arrayer or colony-picking robot.

In order to overcome this limitation, a stealth pin having about 100 micron wide grooves in the interior and the exterior of the pin has been suggested. A pin having such shape draws up the DNA oligomer solution by the capillary phenomenon when dipped in the solution, and makes it possible to print the DNA oligomer solution repeatedly on several plates. Up to now, spotting pins disclosed in U.S. Pat. Nos. 6,110,426 and 5,807,522, issued to Shalen et al. and Brown et al., respectively, and U.S. Pat. No. 6,101,946 have been known as those used in the spotting or contact-printing method issued to Martinsky. These pins have the space for reserving the sample solution. The size or the shape of the space is variable.

In use these pins can also bear impact by repetitive contact and block the reaction with the sample solution because these pins are made of stainless steel.

These pins are dipped in the sample solution and draw up the sample solution into the interior of a capillary by the capillary phenomenon. At that time, the contact between the sample solution and the inner wall of a capillary causes the difference of the surface energy. The sample solution forms a convexity or a concavity at the tip of the pins thereby. And then, the pins touch the surface of a plate, and spot the sample on the plate.

The shape of a stealth pin is known to be most suitable among existing pins for manufacturing the DNA chip by the spotting method. The shape of a stealth pin comprises a flat tip and an open-sided exterior channel reserving the predetermined volume of the sample solution.

This stealth pin is prepared through EDM (electric discharge process) and the like. According to EDM, at first one end of a metal shaft is incised as much as the predetermined length along the central axis of the pin, so that open-sided channel is formed. Finally, the gap is formed in the point. Generally, the upper part of this channel can be used for reserving the sample solution drawn through the channel by the capillary force. However, this pin can reserve only the predetermined volume of the sample solution because the enlargement of the upper part cannot but be limited. Therefore, this structure maximizes the contact between the sample solution and the inner surface of the pin and results in the high surface tension, so that a meniscus is formed concavely inward into the channel.

In addition, a tip of the pin should contact a plate with strong impact in order to spot the sample solution on a plate by using the spotting pin having the above-described shape. More specifically, a tip of the pin should contact the plate with a fixed velocity or with an accelerated velocity due to inward meniscus, in order to drop the defined volume of the reagent solution on a plate. Thereafter, movement of the pin suddenly stops and the sample solution prints on the plate. That is, in order to print the reagent solution on a plate by using a conventional spotting pin, a tip of the pin should contact the plate, and then the pin should move in the apposite direction or stop by the inertia of movement, in order to drop the sample on the plate.

Therefore, the conventional type of a spotting pin has a drawback that the diameter of a spot becomes larger because a tip is worn away by colliding with a plate. In addition, the plate or the pin can become damaged. Thus, precise mechanical operation is required in order to prevent the abrasion of the tip or the damage of the plate. Still further, the number of spots that can be made with each dipping is limited because the pin holds only a predetermined volume of the sample.

These things can cause many problems such as lack of durability, the irregularity of a spot, the spatial limitation in reserving the solution and so on. Therefore, they act as the big restrictions in the microarraying process that consequently requires many repeated spotting of various kinds of protein or nucleotide sample.

As will be recognized, in the pin-spotting method, several pins having a tip of 50 mm to 300 mm inner diameter are inserted in the holder. The pins are dipped into the DNA oligomer solution and are moved by the up-and-down and the left-and-right movement of a holder. And then, they draw and drop the DNA oligomer solution on a plate to form a spot of DNA oligomer.

That is, because the DNA oligomer solution spots on the plate by the up-and-down movement of the pin holder, a mechanical device should be controlled precisely. In addition, in order to form spots having 100 mm diameter within 1 $cm^2$ area with high density, a pin is required to move precisely and rectilinearly.

However, in existing spotting devices used for microarraying DNA oligomer, a pin cannot move precisely and rectilinearly because it inclines in the holder. Therefore, conventional devices have the problem that a spot deviates from the target location or overlaps other spots.

In addition, the size of spots is irregular and a pin slides out of the target location by separating from a plate after contact. Therefore, it is difficult to fabricate an accurate and dense microarray by using existing spotting devices.

Therefore, this technical field requires a spotting pin i) to increase the number of spot that can be spotted through one dipping ii) to minimize the contact between its tip and a plate, iii) to minimize impact added to itself and a plate at the moment of contact, iv) to maintain the regularity of the amount and the shape of spots, and finally v) to be improved in the aspect of the durability and quality compared with existing spotting pins; and a pin spotting device to make spotting pins move accurately rectilinearly in the up-and-down direction.

Therefore, the object of the present invention is to provide the spotting device that comprises i) a pin-guiding holder to secure reproducibility of the location of spots and to allow pins to move accurately rectilinearly in the up-and-down direction, and ii) pins inserted into the spotting device. Further, objects of the present invention are to provide pins: i) to increase the number of spots that can be spotted through one dipping, ii) to minimize the contact between the tip of the pin and a plate, iii) to minimize impact added to itself and a plate at the moment of contact, iv) to maintain the regularity of the amount and the shape of spots spotted, and v) to be improved in the aspect of the durability and quality compared with existing spotting pins.

BRIEF SUMMARY OF THE INVENTION

The object of the present invention is achieved by providing a spotting device for fabricating microarrays of biological samples, which comprises:

several spotting pins for spotting biological samples on a plate;

a upper guiding plate which has pin-inserting holes to form two (2) pin-supporting points;

a guide wire which forms one (1) pin-supporting point;

a regulation block wherein said guide wires are mounted in several up-down rows;

a spring plate which pushes said regulation block inserted in the frame toward the side whereon the regulation screw is installed;

a regulation screw which pushes said regulation block toward the side whereon the spring plate is installed;

a frame wherein said regulation block is inserted, and wherein spring plate is inserted, and wherein the regulation screw is mounted; and a lower guiding plate which has pin-inserting holes to form two pin-supporting points.

The guide wire (3) of the present invention is made of elastic materials to regulate pin-supporting force by the regulation screw (7).

Another object of the present invention is achieved by providing a capillary spotting pin, comprising a capillary part and a reservoir part connected on said capillary part, and characterized in that the inner diameter of reservoir part is larger than that of capillary part.

The diameter of the tip can be regulated properly according to the desirable size of a spot. Also, the diameter and the length of the capillary part and the reservoir part can be regulated properly according to the section of solution desired to project out of the pin.

The spotting pin of the present invention is characterized in that the section of the sample solution projects downward of the pin, because the drawing force of the sample solution in the capillary part is countered by the gravity of the sample solution in the reservoir part and the gravity of the sample solution in the reservoir part is slightly stronger than the capillary force.

That is, the spotting pin of the present invention is characterized in comprising a capillary part and a reservoir part connected to said capillary part, having larger inner diameter than said capillary part.

The upper cylindrical tube functions as adding the gravity in order that the section of the sample solution in the tip might project convexly downward of the pin. The lower cylindrical tube is made of a capillary with a small diameter. It can make a small and minute spot and generate the force drawing the sample solution by the capillary phenomenon.

The shape of section formed in the tip is controlled properly by the gravity of the sample solution retained in the reservoir part and by the capillary force generated in the capillary part.

The above-mentioned capillary force varies according to the diameter and the length of capillary part. The capillary force is generated by the difference of surface energy between the sample solution and the inner wall of the capillary.

Each of surface energy is the specific value according to the quality of the sample solution and the inner wall of capillary. Therefore, the shape of the section in the tip can be regulated by changing the quality of surface of the inner wall of the capillary.

The capillary part and the reservoir part of the present invention can have the same quality or different quality with each other. In addition, the inner surface of the capillary part and the reservoir part can be changed to have hydrophilicity or hydrophobicity, differently from each other. Most preferably these parts can be made of metal or glass.

By each of following equations, the capillary force of the spotting pin and the gravity of the sample are calculated, and thereby, specific embodiments of the spotting pin of the present invention are decided. The embodiments of the pin of the present invention are embodied by specifying the diameter and the length of each part, the sample solution, and material forming each part. When the capillary is dipped in the sample solution and the sample solution is drawn by the capillary phenomenon, the capillary force(s) is explained as follows:

$$s = 2prY \cos q$$

Wherein 2r is the inner diameter of the capillary part, Y is the interfacial tension of the sample solution, and q is a contact angle of the meniscus formed in the surface of the upper part of the pin. The capillary force increases proportionally according to the increase of cos q, Y, and r.

As will be appreciated, q and Y are the predetermined by the quality of the sample solution and the capillary, and q and Y of glass are similar to those of metal. Therefore, the capillary force is primarily decided by r. That is, the capillary force increases according to the increase of r.

The gravity of solution in the reservoir part is as follows:

$$w = pr^2 rgh$$

Wherein r is the specific gravity and h is the height from the surface of solution wherein the pin is dipped to the liquid-level in the capillary.

If these two forces are same, the liquid-level in the capillary is horizontal, namely:

$$2prY \cos q = pr^2 rgh$$

Therefore, when the capillary is dipped in the solution and two forces are in equilibrium, two forces are expressed as an above equation.

The capillary force increases in proportion to the increase of r, whereas the gravity of the sample solution increases in proportion to the increase of $r^2$. As a result, if r is very small, the sample solution is drawn more into the interior of the pin. If r increases, the sample solution is drawn less, because the gravity of the sample solution is stronger than the capillary force. However, if the capillary is raised from solution, another interface is formed at the tip of a capillary. Therefore, the following equation is induced:

$$2prY \cos q = 2prY \cos q¢ + pr^2 rgh$$

Wherein q¢ is a contact angle of the surface of the solution, that is, meniscus formed at the tip of the capillary.

When the capillary is raised from solution, the capillary force and the gravity are same, and thus cosq¢ is zero, that is, q¢ is 90°. Therefore, the liquid-level in the tip of a capillary becomes horizontal.

If the solution in the capillary continues to be used, h decreases and thus the gravity decreases. However, because the capillary force(s) is always constant, cosq¢ value gets to increase and q¢ gets to decrease in order to maintain the equilibrium in the above equation. Therefore, the meniscus in the tip of the capillary is formed more concavely toward the inner part.

Meanwhile, Y(the value of the interfacial tension) of hydrophilic surface is larger than Y of hydrophobic surface. Therefore, in the case that the surface of the capillary is hydrophilic, the gravity is relatively smaller than the interfacial tension. According to the change of h, cosq¢ isn't remarkably changed, and q¢ is also changed less.

However, if the surface of capillary is hydrophobic, the interfacial tension becomes small, and thus the effect of gravity becomes relatively large. Therefore, in the above equation, according to the change of h, cosq¢ is remarkably changed and q¢ is changed much. As a result, the meniscus becomes more concave toward the interior of the capillary.

Therefore, in the case that the surface of the capillary is treated as hydrophilic material, the change of q¢ becomes insignificant, so that the horizontal liquid-level can be always maintained and the surface of solution can be the least concave toward the interior of the capillary.

As mentioned above, the amount of the sample solution drawn into the interior of a pin can be controlled.

In the case that the interior of the pin is treated as hydrophilic material as far as the point where the sample solution is desired to be filled and the other part is treated as hydrophobic material, the sample solution goes up only as far as the hydrophillic surface and the excessive amount of the sample solution isn't filled. That is, the amount of the sample solution drawn into the interior of the capillary can be controlled thereby. Therefore, the proper amount of the solution can be drawn without drawing the excessive amount of the sample solution into the interior of the capillary pin.

In addition, in the case that the outside of the pin is treated as hydrophobic material, the pin isn't stained with the sample solution. Therefore, the beginning test process to eliminate the sample staining the outside of the pin can be minimized or omitted.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE INVENTION

Figure 1:
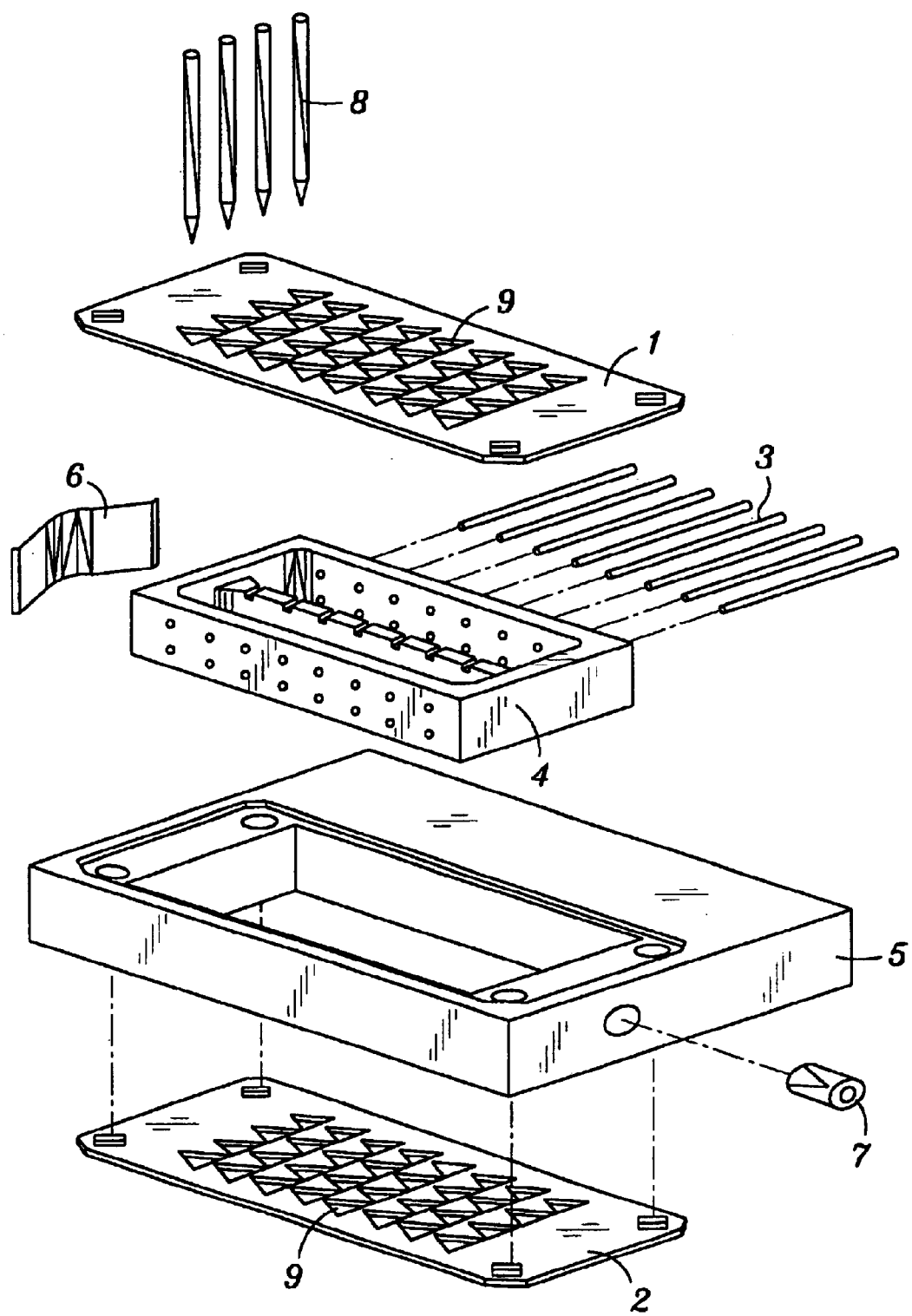
FIG. 1. shows the perspective view of the dissembled spotting device of the present invention.

A spotting pin and a spotting device expressed in attached drawings and the embodiments are not meant to be a limitation upon the true scope of the invention, but merely to be illustrative and representative thereof. To facilitate the understanding of the present invention the following list of components, as referenced in the drawings is provided:

1: the upper guiding plate
2: the lower guiding plate
3: the guide wire
4: the regulation block
5: the frame
6: the spring plate
7: the regulation screw
8: the pin FIG. 1. shows an exploded perspective view of a disassembled spotting device for fabricating microarrays of biological samples by the present invention.

A spring plate (6) is installed in an inner surface of a frame (5). On the opposite inner surface, a hole wherein a regulation screw (7) for controlling the location of a regulation block is inserted tightly is formed.

Guiding plates (1,2) are attached on the top and the bottom of the frame (5) of the present invention, and the regulation block (4) is installed in the frame (5).

As illustrated in FIG. 1, aisles composed of aligned holes are formed horizontally in the regulation block, and several guide wires (3) having one attaching and supporting point with each cylindrical pin are insertable in the holes side by side. More particularly, the holes are formed in several upper and lower rows on the wall of the regulation block.

The guide wires(3) are arrayed at regular intervals across the regulation block and installed in the regulation block by inserted in each of the holes.

Preferably the holes are formed in the two upper and lower rows on the walls such that the spring plate (6) or the regulation screw (7) are formed on opposed sides of the regulation block.

In the case of being inserted vertically, the pin contacts the two upper and lower guide wires respectively. That is, the pin is inserted into the regulation block and supported by guiding the two guide wires.

The regulation block (4) is fixed by the spring plate(6) and the screw (7) which controls the location of the regulation block.

The spring plate (6) is installed between the regulation block and the frame, and pushes the regulation block. Therefore, the regulation screw on the opposite side of the spring plate controls the right-and-left location of the regulation block in the frame.

Generally, the spring plate (6) and the screw control (7) the right-left location in the frame by making the size of the regulation block installed in the frame smaller than that of frame. In addition, the guide wires guiding pins control the force added into the pins because the location of the regulation block can be controlled in the frame.

The guiding plates (1,2) consist of the upper guiding plate (1) and the lower guiding plate (2), which are attached respectively on the upper surface and the lower surface of frame.

Holes (9) having a round or a polygonal shape are formed on the upper and the lower guiding plates and have more than two guiding and supporting points with the pins respectively. The shape of hole formed on the guiding plate can be various such as round or polygonal shape and the like. As illustrated in FIG. 1, preferably triangular or octagonal, most preferably triangular holes are desired in order to form such guiding and supporting points.

The number of holes (9) can be controlled according to that of inserted pins. As an embodiment of the present invention, thirty-two triangular holes are formed and thirty-two pins are installed on the guiding plate.

As illustrated in FIG. 1., the above-mentioned holes are triangle and totally thirty-two as eight times four. The pins are inserted in the triangular holes and contact them at two points.

Figure 2:
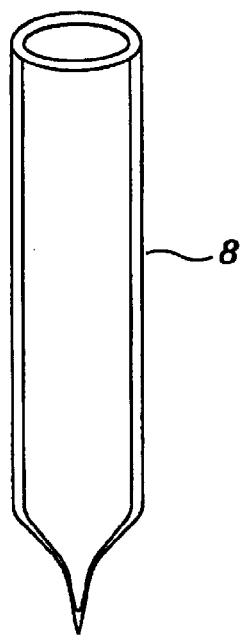
FIG. 2. is the perspective drawing of the spotting pins of the present invention.

FIG. 2 is the schematic representation of the pin (8) of the present invention. The pin (8) contacts the edge of the holes (9) on the upper guiding plate respectively at the two points, two rows of the guiding wires respectively at the two points, and the edge of triangular hole on the lower guiding plate at the two points. Therefore, the pin is supported at total six points.

The location of the regulation block is controlled by moving toward the right-and-left direction by the regulation screw (7). And the pin (8) is fixed in the holder by the supporting force added at the above-mentioned points.

The pins (8) contact at four supporting points of holes formed on the guiding plate with the guide wires (3), as elastic material, push the pins toward four supporting points and control the extent of fixation of the pins.

When the pins-installed holder is operated in the up-and-down direction, the pins (8) can move accurately rectilinearly without inclining in the holder.

According as contacting points get to increase and contacting area gets larger between the pins and the holder, the frictional force gets to increase. Therefore, the vertical movement of pins can have the problem by the frictional force and the pins are also worn out easily.

In the spotting device of the present invention, by making more than five (5), preferably six (6) pin-supporting points, the frictional force can be minimized, and at the same time pins can be fixed properly to move accurately rectilinearly in the up-and-down direction smoothly.

The capillary pin or stealth pin can be used for the pin of the present invention.

As will be appreciated, the diameter of the pin is very important because the size of spots in DNA chips is decided thereby. In the present invention, preferably capillary pins, of which inner diameter is between 0.05 mm and 3 mm, generally between 0.05 mm and 2 mm, can be used.

Also, various types of prior art stealth pins, such as fountain pen-shaped pins, modified pins, as well as capillary pins can be used in the spotting device of the present invention. In the present invention, "stealth pin" may take the form of any of those pins disclosed in U.S. Pat. Nos. 6,110,426, 5,807,522, and 6,101,946, the teachings of which are expressed incorporated herein by reference, and ArrayIt™ pin marketed by Telechem International Inc. exemplary of a commercialized stealth pin.

Preferably, a stopper (not shown) is inserted into the end opposed by the capillary part of pin (8), in order to install each spotting pin in the holder. Stopper can be inserted into the end of pin or the specific place of pin.

In the present invention, the stopper is made of elastic material such as rubber, of which center has the hole wherein the pin is inserted. Other elastic material, metal, or alloy and the like can be used as material of the stopper.

Although the present invention suggests the holder that employs 32 pins (i.e., eight times four), the present invention is not limited to this and the holder that employs 128 pins as sixteen times eight can be also used.

In the present invention, in the case of 32 pins, the sample can be microarrayed within a short time by using 384 well plate properly; in the case of 128 pins, much larger amount of sample can be microarrayed within a short time by using 1536 well plate.

Figure 3:
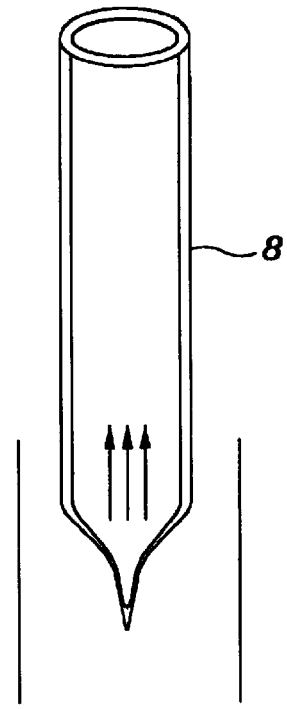
FIG. 3. shows a fluid inlet of the sample solution by the capillary force in the spotting pin of the present invention.

When dipped in the well containing biological materials, a spotting pin draws the sample, as shown in FIG. 3, and then a robot arm moves the pin according to xyz orthogonal coordinates. Finally, the pin contacts on the plate and forms the spot of the sample on the plate.

As illustrated in FIG. 2., the inner diameter of tube forming the reservoir part is larger than that of the tube forming the capillary part. This is for allowing the gravity of the sample solution to approach the capillary force.

However, in order that the gravity of the sample solution might be slightly larger than the capillary force and the section of solution might project toward outside, the inner diameter ratio of capillary part to reservoir part and the length of capillary part are exactly calculated.

As a capillary pin (8) of the present invention, the glass tube that can be purchased commercially and has between 0.8 mm and 1.75 mm inner diameter was used.

The capillary part was prepared to have approximately between 50 mm and 300 mm inner diameter, and the inner diameter ratio of the capillary part to the reservoir part can be variously regulated within the range of approximately 5:1 to 30:1.

Best Mode for Carrying Out the Present Invention

Hereinafter, the present invention will be described in greater detail with reference to the following examples. The examples are given for illustration of the invention and not intended to be limiting the present invention.

EXAMPLE 1

Manufacturing a Capillary Pin

In order to manufacture a capillary spotting pin of the present invention, Kwik-Fil™ Borosilicate Glass Capillaries manufactured by World Precision Instruments corporation was used. The external diameter was 1.5 mm and the inner diameter was 1.12 mm and the length was 76 mm.

The capillary spotting pin was prepared though the general glass-processing method for manufacturing glass devices used in the laboratories. That is, when beginning to melt by applying heat to the central place of a glass capillary, the capillary was pulled toward both terminal direction. When the central part of the capillary got slim, the capillary was hurt by ceramic for manufacturing semiconductor plate and cut out. Repeating these processes in several times, the capillary of which cut end is located in the center and of which external diameter is proper was selected.

In this embodiment, the external diameter of cut end was approximately 0.2 mm and the length of capillary part was approximately 2 mm.

EXAMPLE 2

Changing the Quality of the Surface in the Inner Part of the Pin

In a tip of a capillary, in order to check the shape change of the section of the solution according to changing the quality of surface in the inner part of the pin, the capillary having approximately 1 mm diameter was treated chemically as hydrophilic coating material.

Particularly, the capillary contacted the solution of coating material and was hardened over 125 degrees centigrade for approximately 30 minutes.

After the capillary was dipped into the sample solution, the section of the solution formed at the tip of the capillary was observed.

Figure 5:
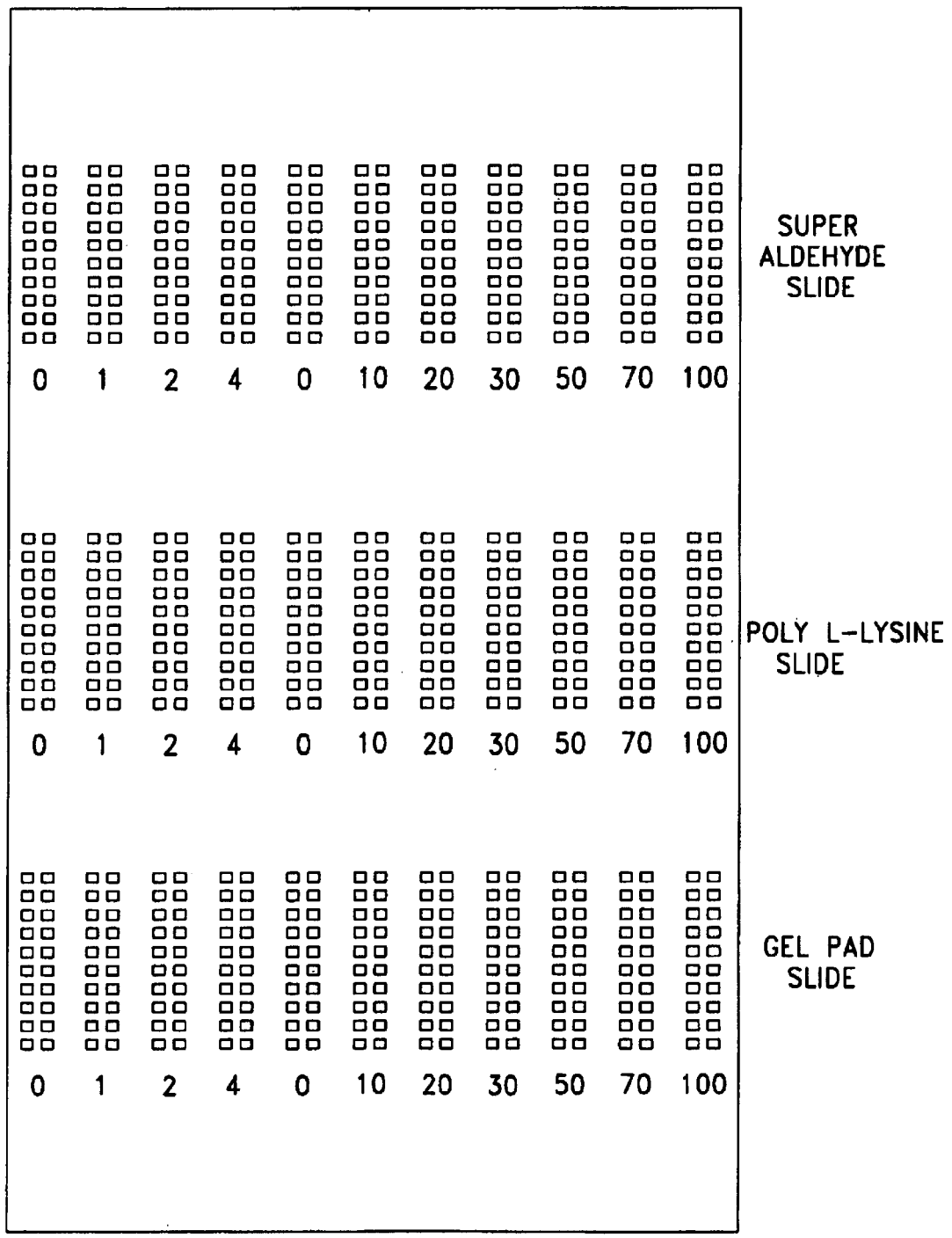
FIG. 5. is the result showing the extent of abrasion of the tip of the pin according to dropping number, in the case that the sample solution is dropped by using the pin of the present invention.
Figure 6:
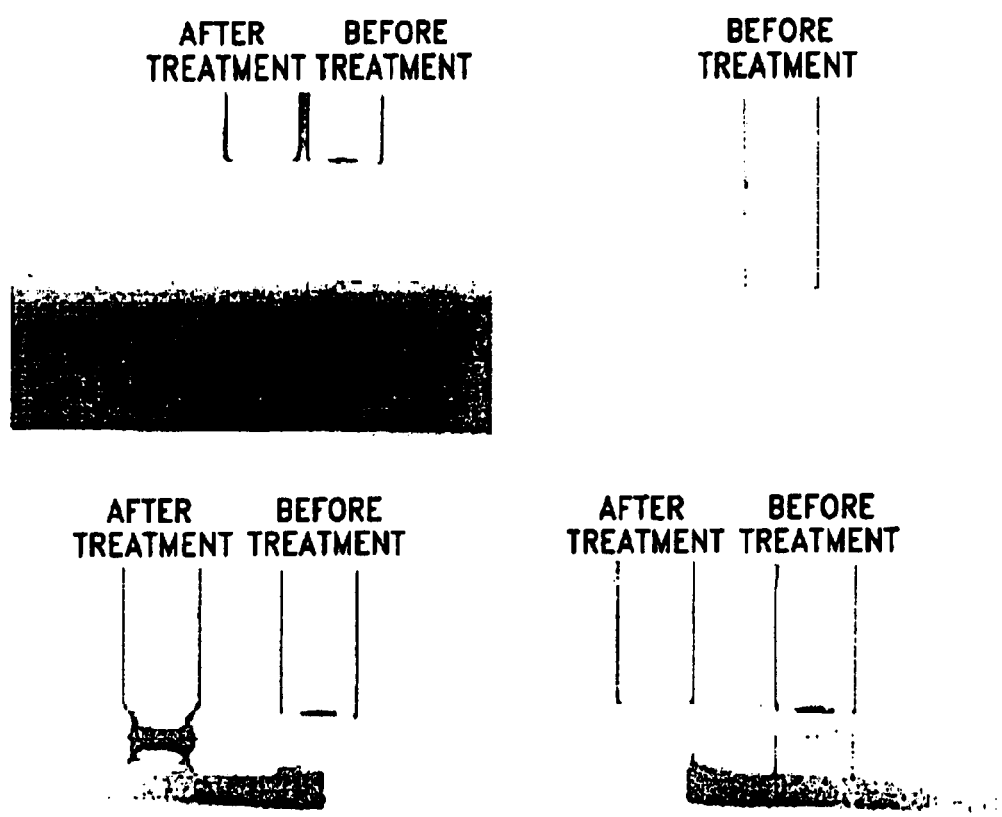
FIG. 6. is an enlarged drawing of the section of capillary according to the qualitative change of capillary.

The results are illustrated in FIG. 5. As illustrated in FIG. 5, it is observed that in the capillary treated chemically according to this embodiment, the liquid level is formed horizontally in the tip of the capillary, whereas in the capillary which wasn't treated so, the liquid level was raised toward the inner part of the capillary.

In the case that an inner face of a capillary is treated to have hydrophilicity, it is observed that the gravity of solution in the inner space of the pin is almost equal to or superior to the capillary tension.

Therefore, in case of surface-treated capillary, the sample solution can be easily spotted without applying the force to the pin.

EXAMPLE 3

The Extent of Abrasion of a Pin According to Spotting Number

The pin prepared through the above-mentioned embodiment was installed in an automatic microarrayer, and the solution was dropped on several kinds of slides generally used for manufacturing microarrays.

Figure 4:
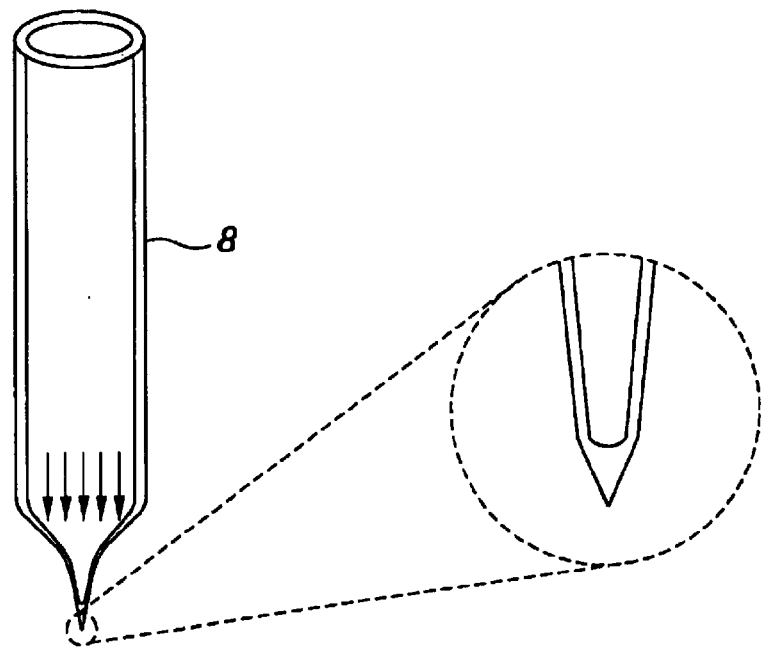
FIG. 4. is an enlarged drawing of the section of the sample solution formed in the tip of the pin.

According to the frequency that a pin was used, the extent of abrasion of the pin is observed (FIG. 4.). The spotting velocity was twice per second; the used slides were i) SuperAldehyde slide purchased from ArrayIt corporation, ii) the slide which was purchased from Sigma corporation and coated by poly L-lysin, and iii) the Gel pad slide manufactured by the inventor; 20 points per each time are spotted.

Synthetic oligonucleotide solution marked by fluorescent material was used as a sample.

The slide spotted first as control group (0 times), was compared with that of comparative group, after spotting $10*10^4$ times. According to the same method as above-mentioned, reagents are spotted respectively $2*10^4$, $4*10^4$, $6*10^4$, $10*10^4$, $20*10^4$, $30*10^4$, $50*10^4$, $70*10^4$, $100*10^4$ times.

In order to prevent the sample from contaminating the pin, the same reagent is spotted again, after washing the pin with the third sterilized distilled water three times just before spotting, The shape and the size of spots were observed by detecting fluorescence of the sample, using Genepix 4000A Microarray scanner of Axon Instruments Corporation.

In the results of the above-mentioned experiment, all slides had no change in the shape and the size of the spots, compared with the control group.

The spotting pin of the present invention is so strong and elastic that the extent of abrasion can't be detected after spotting $100*10^4$ times.

Industrial Applicability

The present invention is the spotting device for microarraying biological samples, which comprises i) several pins; and ii) a pin guiding holder which contacts to support the pins respectively at more than five points.

This spotting device minimizes friction by minimizing contact between the pins and the holder, so that the durability of the pins is improved.

In addition, the pins are allowed to move accurately rectilinearly in the up-and-down direction, so that the reproducibility of the location of spots is secured. Therefore, biological materials can be microarrayed accurately.

In addition, in the case that the biological sample is spotted on a plate, the capillary pin of the present invention can minimize impact of contact between the tip of the pin and the plate because of forming convex section in the tip of the pin.

That is, the amount of the biological reagent solution drawn from the reservoir part can be remarkably increased as well as the damage of the plate or the tip of the pin can be prevented thereby. Therefore, the efficiency of spotting process can be improved remarkably by employing the spotting device of the present invention.

Although the invention has been described with reference to a specific embodiment, this description is not meant to be construed in a limiting sense. Various modifications of the disclosed embodiment as well as alternative embodiments of the invention will become apparent to one skilled in the art upon reference to the description to the invention. It is therefore contemplated that the appended claims will cover any modifications of the embodiments that fall within the true scope of the invention.

What is claimed is:

1. A spotting device for fabricating microarrays of biological samples, which comprises:
   a frame comprising a first side and a second opposing side;
   a plurality of spotting pins for spotting biological samples on a plate;
   an upper guiding plate which has pin-inserting holes to form at least two (2) pin-supporting points;
   a plurality of guide wires each forming at least one (1) pin-supporting point;
   a regulation block wherein said guide wires are mounted in a plurality of up-down rows; wherein said regulation block is inserted in said frame:
   a spring plate, inserted in said frame, pushes said regulation block inserted in the frame toward said first side;
   a regulation screw, mounted in said frame, pushes said regulation block toward said opposing side; and
   a lower guiding plate which has a plurality of pin-inserting holes to form at least two pin-supporting points.

2. The spotting device for fabricating microarrays of biological materials according to claim 1, wherein said guide wire is made of metal.

3. The spotting device for fabricating microarrays of biological materials according to claim 1, wherein said pin is selected from the group consisting of a capillary pin and a stealth pin.

4. The spotting device for fabricating microarrays of biological materials according to claim 3, wherein said capillary pin comprises a capillary part and a reservoir part connected to said capillary part, said reservoir part having larger inner diameter than said capillary part.

5. The spotting device for fabricating microarrays of biological materials according to claim 4, wherein the inner diameter of said capillary part is between 0.03 times to 0.2 times that of the reservoir part.

6. The spotting device for fabricating microarrays of biological materials according to claim 4, wherein the inner diameter of said capillary part is between 0.01 mm to 0.5 mm and the length said capillary is 0.5 mm to 3 mm.

7. The spotting device for fabricating microarrays of biological materials according to claim 1, wherein said guide wire is inserted into respective pairs of holes formed in upper and lower rows on the regulation block.

* * * * *